(12) United States Patent
Yoshida

(10) Patent No.: US 9,401,809 B2
(45) Date of Patent: Jul. 26, 2016

(54) COMPOSITE SYSTEM, METHOD, AND STORAGE MEDIUM

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 13/693,409

(22) Filed: Dec. 4, 2012

(65) Prior Publication Data

US 2013/0179675 A1    Jul. 11, 2013

(30) Foreign Application Priority Data

Jan. 5, 2012    (JP) .................................. 2012-000482

(51) Int. Cl.
H04L 9/30        (2006.01)
H04L 9/32        (2006.01)
G06F 21/57       (2013.01)

(52) U.S. Cl.
CPC ................ *H04L 9/30* (2013.01); *G06F 21/572* (2013.01); *H04L 9/3252* (2013.01)

(58) Field of Classification Search
None
See application file for complete search history.

(56) References Cited

U.S. PATENT DOCUMENTS

| 8,522,045 | B2 * | 8/2013 | Senda ............................ 713/189 |
| 2005/0152350 | A1 * | 7/2005 | Sung et al. ..................... 370/376 |
| 2008/0219435 | A1 * | 9/2008 | Kodama ................ H04L 9/3242 380/28 |
| 2011/0197066 | A1 | 8/2011 | Senda |

FOREIGN PATENT DOCUMENTS

| CN | 101304569 A | 11/2006 |
| CN | 101110982 A | 1/2008 |
| CN | 101770386 A | 7/2010 |
| JP | 2000-148502 | 5/2000 |
| JP | 2011-164810 | 8/2011 |

OTHER PUBLICATIONS

Office Action issued on Mar. 11, 2015 in Chinese Application No. 201310002574.8.
Wang, "Research and Application of the Hardware Encryption System", College of Information Engineering, Mar. 15, 2006, pp. 11-20, 24-28, and its English translation.

* cited by examiner

*Primary Examiner* — Saleh Najjar
*Assistant Examiner* — Simon Kanaan
(74) *Attorney, Agent, or Firm* — Oblon, McClelland, Maier & Neustadt, L.L.P.

(57) ABSTRACT

In a composite system that includes a main system that operates with a main program and a plurality of sub-systems that operate both with sub-programs and under the control of the main system attachably and detachably connected with each other via a predefined bus, the main system transfers each fragment of divided target data to the sub-system, and the sub-system includes a receiving buffer that can read and write the fragment of data received from the main system temporarily. An encrypting process can be executed with the main system and the sub-system regardless of the size of target data to be encrypted, the size of memory in the sub-system, and data transfer capability between the main system and the sub-system even if the size of the target data in the main system is bigger than the size of the receiving buffer in the sub-system.

20 Claims, 14 Drawing Sheets

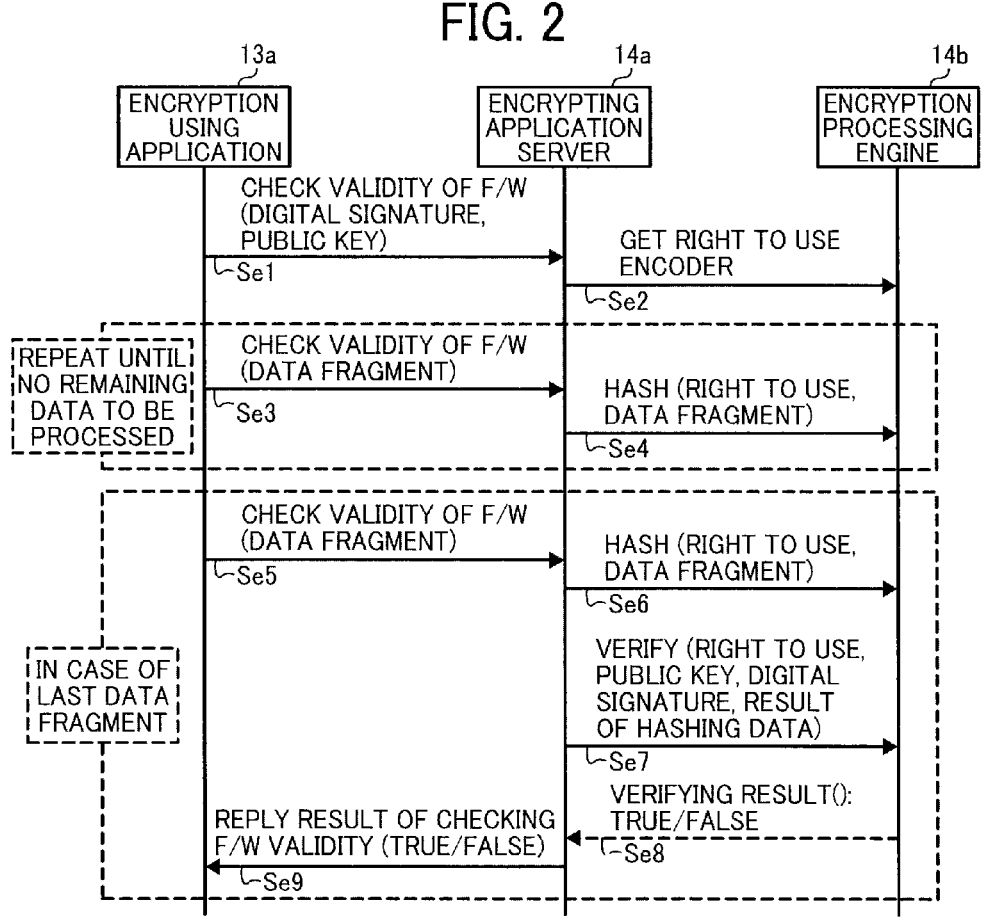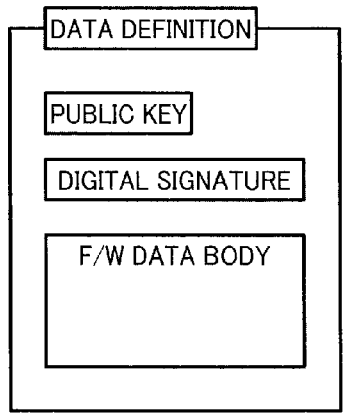

COMPOSITE SYSTEM, METHOD, AND STORAGE MEDIUM

CROSS-REFERENCE TO RELATED APPLICATIONS

This patent application is based on and claims priority pursuant to 35 U.S.C. §119 to Japanese Patent Application No. 2012-000482, filed on Jan. 5, 2012, in the Japan Patent Office, the entire disclosure of which is hereby incorporated by reference herein.

BACKGROUND OF THE INVENTION

1. Field of the Invention

The present invention relates to a composite system, method, and storage medium, and more particularly to facilitating transfer of data to be encrypted from a main system to a sub-system.

2. Description of the Related Art

Conventionally, a composite system that integrates a plurality of systems has been constructed. In such a composite system, a central processing unit (CPU) is included in each sub-system and controls the sub-system, and a CPU in a main system controls the whole system.

Since it is easy to attach and detach a sub-system in this kind of composite system, it is becoming an important issue to protect users' personal information stored in the composite system. Also, in this kind of composite system, illegal tampering and information leaks by software that pretends to be a sub-system are becoming an issue.

Also, a sub-board that includes hardware to process encryption to implement high-speed, energy-efficient cryptographic communication has been proposed. This technology adopted a configuration that did not include a cryptographic processing function in a main system and instead utilizes an encrypting function of a sub-system. Therefore, it was necessary that an encrypting process to check validity of firmware data (e.g., about 30 MB size) be executed on the sub-system. However, memory capacity in the sub-system has been minimized (to about a few hundred KB size) due to cost-cutting, memory in the sub-system could not store all the data.

A technology of a composite system that includes a main system and a sub-system to assure security from an attack that pretends to be the sub-system has been proposed (e.g., JP-2011-164810-A.) Another technology that implements writing firmware data to shorten communication time at the time of writing firmware data to a storage device via a controller as much as possible has also been proposed (e.g., JP-2000-148502-A.)

However, the system described in JP-2011-164810-A does not delegate a cryptographic process for big target data to other systems. Also, to speed up processing the system described in JP-2000-148502-A divides data at the time of writing firmware, and that is different from dividing at the time of checking validity before writing. Therefore, it is not possible to execute an encrypting process by using a sub-system that includes the encrypting function (common among models) such as checking the validity of firmware since the size of target data to be encrypted in the main system is bigger than the memory size of the sub-system in the systems described in JP-2011-164810-A and JP-2000-148502-A.

As described above, since encrypting processes depend on the size of the target data to be encrypted, the size of the memory in a sub-system, and data transfer capability between a main system and a sub-system, encryption cannot be done in case the size of target data to be encrypted in the main system is bigger than the memory size of the sub-system.

BRIEF SUMMARY OF THE INVENTION

The present invention provides a novel composite system that facilitates an encrypting process even if the size of target data to be encrypted in a main system is bigger than the memory size of a sub-system regardless of the size of target data to be encrypted, the size of memory in the sub-system, and data transfer capability between the main system and the sub-system.

More specifically, the present invention provides a composite system that includes a main system that operates with a main program and a plurality of sub-systems that operate both with sub-programs under the control of the main system attachably and detachably connected with each other via a predefined bus. In the composite system described above, the main system includes a transfer unit that transfers each fragment of divided target data to be encrypted to the sub-system, and the sub-system includes a receiving buffer that can read and write the fragments of data received from the main system temporarily. The composite system can have the main system and the sub-system execute an encrypting process even if the size of target data to be encrypted is bigger than the size of the receiving buffer in the sub-system.

In the present invention, the encrypting process can be executed with the main system and the sub-system regardless of the size of target data to be encrypted, the size of memory in the sub-system, and data transfer capability between the main system and the sub-system. Even if the size of target data to be encrypted in the main system is bigger than the size of the receiving buffer in the sub-system, since the main system transfers each fragment of divided target data to be encrypted to the sub-system and the sub-system includes the receiving buffer that can read and write the fragment of data received from the main system temporarily.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

FIG. 2 is a sequence diagram illustrating a transfer between a main system and a sub-system in FIG. 1A as an embodiment of the present invention.

FIG. 3 is a diagram illustrating a data structure of a digital signature and a public key for the composite system in the first embodiment of the present invention.

DETAILED DESCRIPTION OF THE INVENTION

Figure 1A:
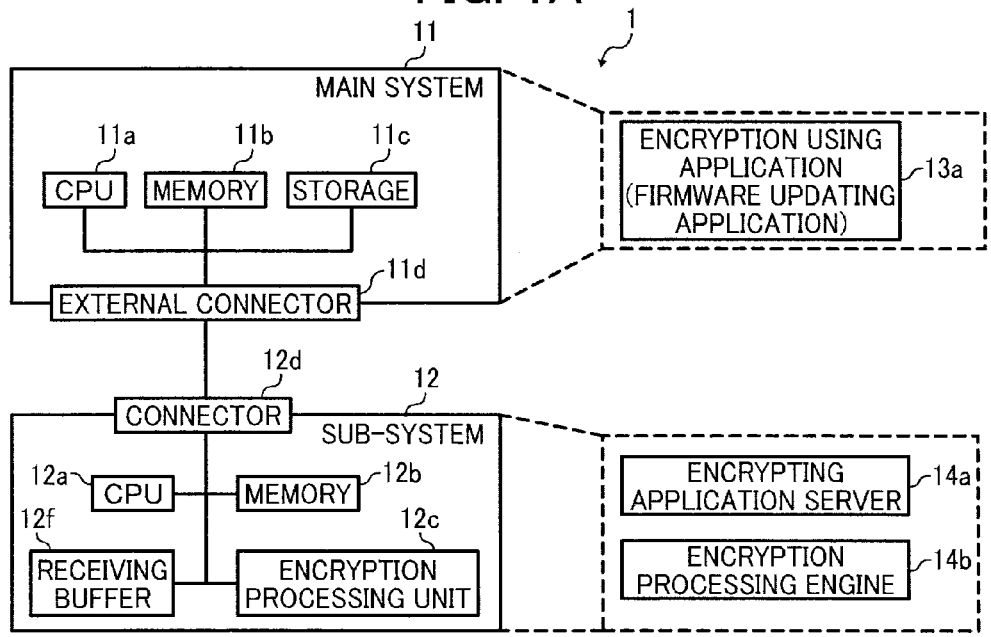
FIG. 1A and FIG. 1B are a diagram and a flowchart, respectively, illustrating a composite system in a first embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings.

First Embodiment

Figure 1B:
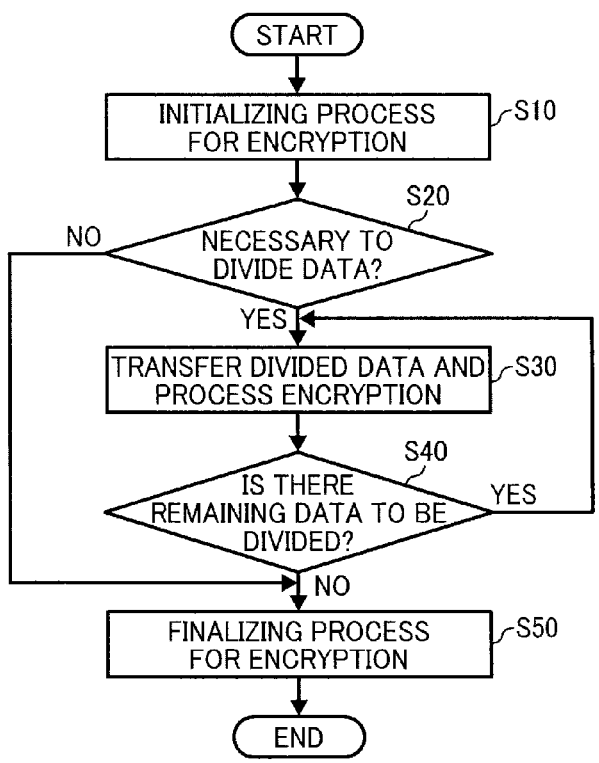

FIG. 1A and FIG. 1B are a diagram and a flowchart illustrating a composite system in a first embodiment. In FIG. 1A, a composite system 1 includes a main system 11, a sub-system 12, and a network communication unit connected to a network (not shown in figures.) The main system 11 and the sub-system 12 are connected with each other via a Universal Serial Bus (USB), and the USB functions as a communication means.

The main system 11 includes a CPU 11a, a memory 11b, a storage device 11c, and an external connector 11d, and they are connected with each other via an internal bus. The storage device 11c stores encryption using application software as application software that can update firmware (F/W). At the boot sequence of the main system 11, the CPU 11a reads the encryption using application from the storage device 11c sequentially and executes each step.

The sub-system 12 includes a CPU 12a, a memory 12b, an encryption processing unit 12c, a connector 12d, and a receiving buffer 12f, connected with each other via an internal bus. The memory 12b stores application software executed by the CPU 12a as an encryption application server 14a. At the boot sequence of the sub-system 12, the CPU 12a executes the encryption application server 14a by reading the application software from the memory 12b sequentially and executing each step. The encryption processing unit 12c functions as an encryption processing engine 14b. Data fragments received from the main system 11 can be read or written temporarily by using the receiving buffer 12f.

In the first embodiment, the memory 12b in the sub-system 12 cannot store all of the target data to be encrypted received from the main system 11 since the size of the memory 12b is very small (about several hundred KB) to reduce manufacturing costs of the sub-system 12. Also, in the first embodiment, checking validity cannot be done by using a normal method that hashes the whole target data to be encrypted in the memory 12b only once and executes a verifying process later just like conventional technologies.

Therefore, to cope with this issue, the main system 11 divides data and transfers the divided data to the receiving buffer 12f in the sub-system 12 in this embodiment. The encrypting method in which the transferred data is hashed n times in units of data fragments and a verifying process is executed later is adopted in this embodiment.

Next, FIG. 1B is a flowchart that illustrates a process of encryption using application 13a in the main system 11. First, in step S10, the CPU 11a initializes encrypting. Subsequently, in S20, the CPU 11a determines whether or not data dividing is necessary.

That is, the CPU 11a divides data amount of firmware into data fragments since the size of the receiving buffer 12f in the sub-system 12 (16 KB) and the size of F/W (30 MB) are fixed. The size of data fragments after dividing is also fixed.

If data dividing is necessary, the process proceeds to S30. Otherwise, the process proceeds to S50. In S30, the CPU 11a transfers the divided data and executes an encrypting process. Subsequently, in S40, the CPU 11a determines whether or not data that has not been divided yet exists. If the CPU 11a determines data that has not been divided yet exists, the step returns to S30 and the process described above is repeated. Otherwise, the process proceeds to S50. Subsequently, the CPU 11a finalizes encrypting in S50.

Next, FIG. 2 is a sequence diagram illustrating a transfer between the main system 11 and the sub-system 12. First, in Se1, the encryption using application 13a executed by the CPU 11a sends a digital signature and a public key for checking validity of F/W to the encryption application server 14a executed by the CPU 12a in the sub-system 12 via the external connector 11d and the connector 12d. Subsequently, the encryption application server 14a executed by the CPU 12a stores the digital signature and the public key in the memory 12b.

Next, in Se2, the encryption application server 14a outputs a command to acquire a right to use the encryption processing unit 12c to the encryption processing engine 14b. Subsequently, in Se3, the encryption using application 13a sends data fragments for checking validity of F/W to the encryption application server 14a.

Next, in Se4, the encryption application server 14a outputs the right to use the encryption processing unit 12c and data fragment to the encryption processing engine 14b to have the encryption processing unit 12c execute hash processing. It should be noted that process in Se3 and Se4 is repeated until the last data fragment after all data is divided as shown in FIG. 2.

Processing of the last data fragment is described below with reference to FIG. 2. In Se5, the encryption using application 13a sends the last data fragment for checking validity of F/W to the encryption application server 14a. Subsequently, in Se6, the encryption using application 13a sends the last data fragment for checking validity of F/W to the encryption application server 14a. In Se6, the encryption application server 14a outputs the right to use the encryption processing unit 12c and the last data fragment to the encryption processing engine 14b to have the encryption processing unit 12c execute the hash processing. In Se7, the encryption application server 14a outputs the right to use the encryption processing unit 12c, public key, digital signature, and hashed result of data to the encryption processing engine 14b to have the encryption processing unit 12c execute the verifying process.

Next, in Se8, the encryption processing engine 14b outputs the true/false value as the result of the verifying process at the encryption processing unit 12c to the encryption application server 14a. Subsequently, in Se9, the encryption application server 14a outputs the true/false value as the result of the verifying process received from the encryption processing engine 14b to the encryption using application 13a.

Abstract of data structure of firmware data to be checked validity is explained below. Signature includes Signature B and data as Header and Signature A, public key B, and image data as Certificate. Firmware data can be configured to add one signature for combined three firmware en bloc.

Next, the role of each piece of data in verification of a digital signature is described below. For example, verification of a digital signature is performed in two stages. In the verifying process as the first stage, the verifying process is executed by using the public key A on the public key B that indicates the scope of checking validity. In the verifying process as the second stage, the verifying process is executed by using the public key B on data that combines data in the scope of checking validity and image data.

More specifically, the verifying process is executed on byte strings to be verified by using the public key A (public key) and the signature (digital signature). In verifying image data as the second stage, data combined with Header data is considered as "byte strings to be verified." For example, Elliptic Curve Digital Signature Algorithm (ECDSA) is used as the algorithm for this process.

Processes for data fragment of arbitrary length by the encryption processing engine 14 is described below. For example, context, public key for signature, hash context, buffer for signature, signature, public key for verification, and a primary storing area for fractional data are preferably used as field definitions of the structure that indicates context of the signature verification (SignedObjContext). In the sub-system 12, data to be verified is stored (overwritten) to the receiving buffer 12f for each fragment (arbitrary length) via the USB bus as the external connector 11d of the main system 11 and the connector 12d.

Alternatively, in the encryption processing engine 14b, the final hash value can be calculated by calling the hash function multiple times, and the hash process can be executed only in multiples of 64 bytes except the last call of the hash function. Therefore, in ACCL, the receiving buffer 12f whose length is 64 bytes is provided for signature verification and fractional data less than 64 bytes produced in signature verification is temporarily stored in the receiving buffer 12f.

By providing the receiving buffer 12f, when fractional data is input, operation of the encryption processing engine 14b in the sub-system 12 consists of three steps (Sb1-Sb3) described below. First, in Sb1, if the receiving buffer 12f is not empty, the encryption processing engine 14b waits until the receiving buffer 12f becomes full and executes the hash process only for 64 bytes. Subsequently, in Sb2, the hash process is executed on remaining fragment data in multiples of 64 bytes en bloc. Lastly, in Sb3, remaining data in Sb1 and Sb2 (less than 64 bytes) is stored in the receiving buffer 12f.

While the hash process is executed twice in Sb1 and Sb2 described above, Sb1 can be omitted by "device" module's optimizing the processing size of the receiving buffer 12f. It should be noted that it is not clear whether or not the optimization described above is effective, so it is necessary to decide whether or not the optimization should be adopted after acquiring result of actual measurement on SoC.

Next, a data structure of a digital signature and a public key is described below with reference to FIG. 3. Data necessary for algorithm of validity verification is mainly a digital signature, a public key, and a data program to be verified. In API, the digital signature and the data to be verified with the digital signature are created in a pair for example. The public key is a structure and is built in program stored in the storage device 11c (mask ROM) in the main system 11.

A signature object consists of [HeaderSection], [CertificateList], and [ImageSection]. [HeaderSection] is a defined format, and version information and a signature etc. are stored there. [CertificateList] is an area to store a certificate necessary for using a signature verification chain, and its area size is variable. Only one certificate is used in this embodiment. [ImageSection] is an area to store programs to be executed, and its size is not fixed. [ImageSection] is padded with 0 if the program size is not in multiples of 16 bytes.

As described above, even if the size of data to be encrypted in the main system is bigger than the memory amount in the sub-system, the encrypting process can be executed by transferring data fragment produced by dividing data to be encrypted to the receiving buffer 12f in the sub-system 12 sequentially by one transferring step and executing hash process regardless of the size of data to be encrypted, memory amount equipped in the sub-system 12, and data transfer capability between the main system and the sub-system. That is, reducing cost can be achieved by reducing memory amount of the memory 12b in the sub-system 12 with assuring connectivity with various main systems 11 in the future.

Second Embodiment

Figure 4:
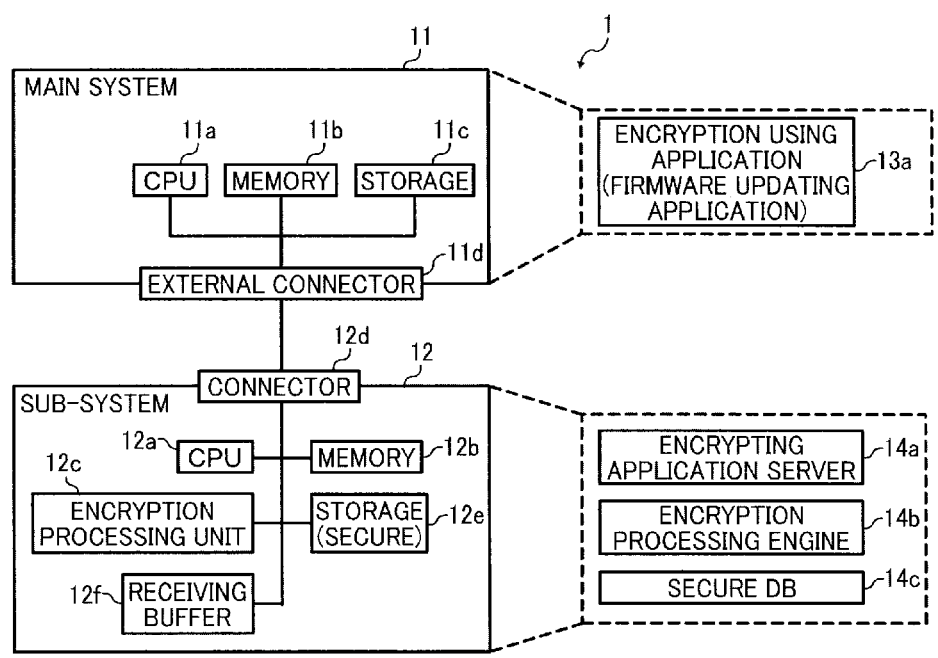
FIG. 4 is a diagram illustrating a composite system in a second embodiment of the present invention.
Figure 5:
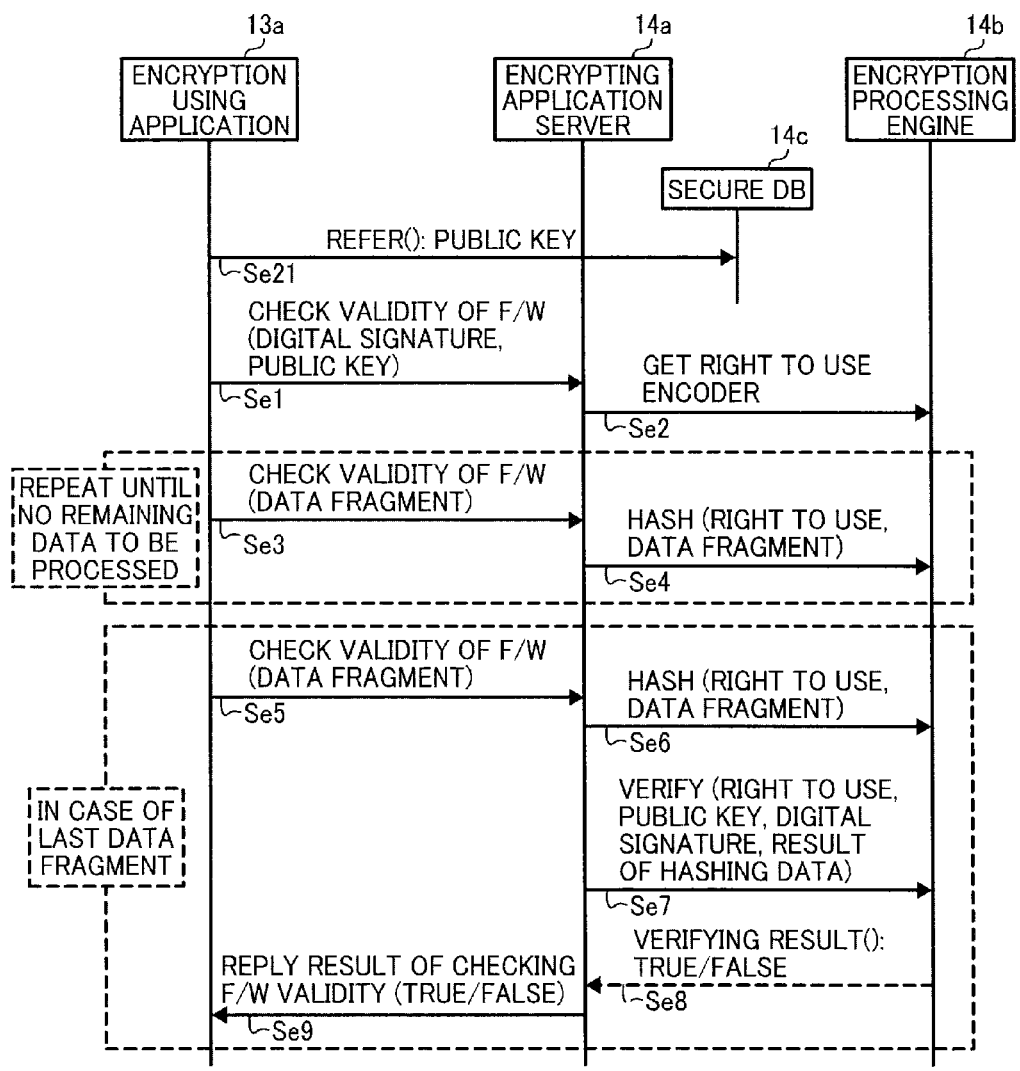
FIG. 5 is a sequence diagram illustrating a transfer between the main system and the sub-system in FIG. 4 as an embodiment of the present invention.

A composite system in a second embodiment of the present invention is described with reference to FIG. 4 and FIG. 5. FIG. 4 and FIG. 5 are partly modified block diagram (FIG. 1) and sequence diagram (FIG. 2) in the first embodiment, so the same symbols are assigned to the same parts and descriptions for those parts are omitted. As shown in FIG. 4, the sub-system 12 includes a storage (secure) 12e and a secure DB 14c, and, as shown in FIG. 5, a step Se21 is added in the second embodiment.

As shown in FIG. 4, the sub-system 12 includes the storage (secure) 12e, and a public key is stored in the storage (secure) 12e as the secure DB 14c. As shown in FIG. 5, in Se21, the encryption using application 13a sends a command to refer to the public key to the secure DB 14c. After receiving the command to refer, the secure DB 14c sends the public key back to the encryption using application 13a.

As described above, security of important data (F/W) can be assured by adding the secure DB 14c to the sub-system 12 without managing security data (public key) in the main system 11.

Third Embodiment

Figure 6:
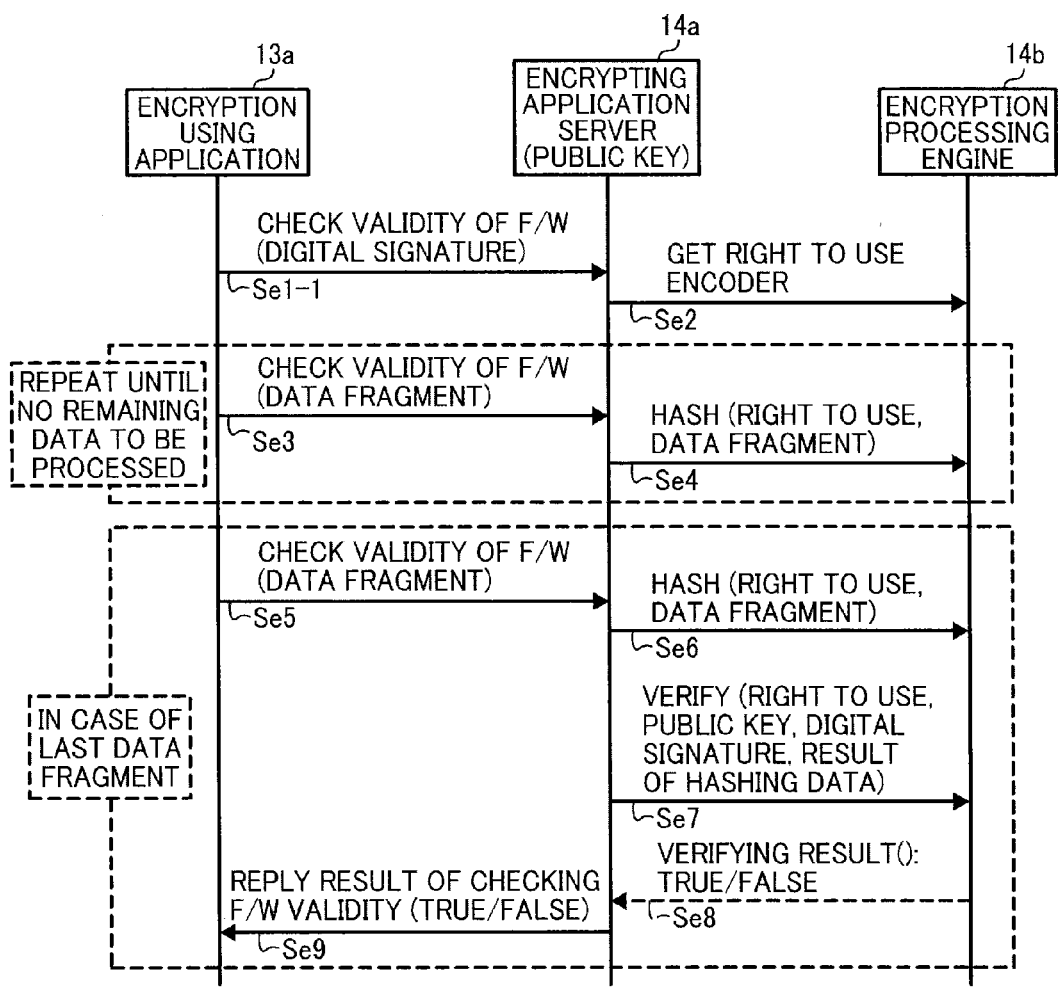
FIG. 6 is a sequence diagram illustrating a transfer of a composite system in a third embodiment of the present invention.

A composite system in a third embodiment of the present invention is described with reference to FIG. 4 and FIG. 6. FIG. 4 and FIG. 6 are a partly modified block diagram (FIG. 1) and sequence diagram (FIG. 2) in the first embodiment, so the same symbols are assigned to the same parts and descriptions for those parts are omitted. As shown in FIG. 6, a step Se1-1 is included in the third embodiment. As shown in FIG. 4, the sub-system 12 includes the storage (secure) 12e, and a public key is stored in the storage (secure) 12e as the secure DB 14c.

In Se1-1, the encryption using application 13a executed by the CPU 11a sends digital signature for checking validity of F/W to the encryption application server 14a executed by the CPU 12a in the sub-system 12 via the external connector 11d and the connector 12d.

By reading the public key from the secure DB 14c, the encryption application server 14a can use the public key in Se7. Consequently, a high-efficiency encrypting process with a reduced number of steps of the encryption using the application and a slight speeding up can be executed by only the encryption application server 14a in the sub-system 12 being able to access the secure DB 14c.

Fourth Embodiment

Figure 7:
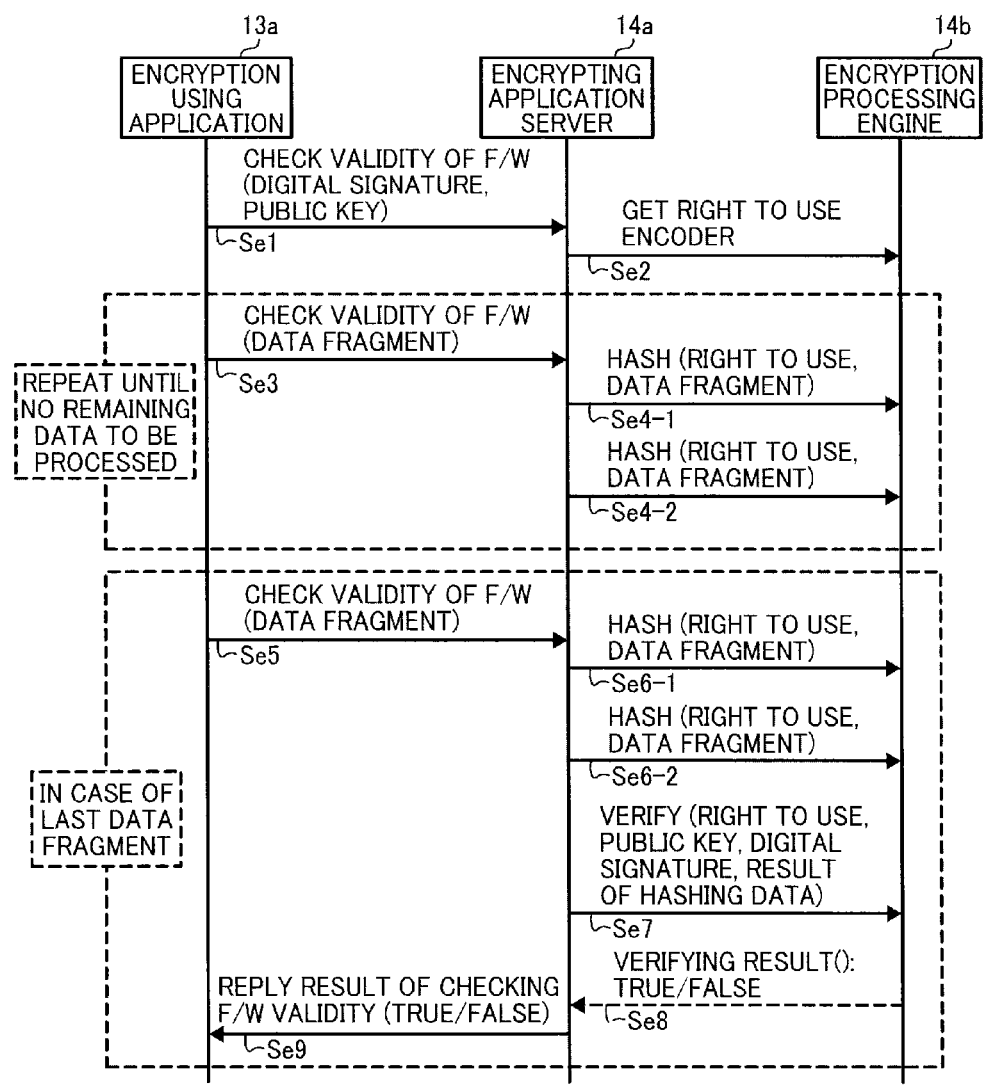
FIG. 7 is a sequence diagram illustrating a transfer of a composite system in a fourth embodiment of the present invention.

A composite system in a fourth embodiment of the present invention is described with reference to FIG. 7. FIG. 7 is a partly modified sequence diagram (FIG. 2) in the first embodiment, so the same symbols are assigned to the same parts and descriptions for those parts are omitted. The encryption application server 14a stores a data alignment rule (e.g., data size of hash is in multiples of 64.)

As shown in FIG. 7, Se4-2 in addition to Se4-1 and Se6-2 in addition to Se6-1 are included in the fourth embodiment. Fragment data used in Se3 is in multiples of 64 bytes for example and no alignment is necessary.

The remainder of alignment in the previous hash process and leading data in the current hash process are combined and hash process is executed in Se4-1. Up to the maximum size of data that can be aligned except the leading part in the current hash process, hash process is executed in Se4-2. It should be noted that the remainder of alignment (e.g., datasize % 64) is temporarily stored in the memory 12b.

Consequently, the encryption using application 13a can transfer data in any size without considering the limitations of the encryption processing engine 14b in the sub-system 12 (e.g., hash process needs to be input in multiples of 64) by the encryption application server 14a's having rule information regarding data alignment, and that can reduce effect of revising the encryption processing engine 14b in the sub-system 12. In other words, that can reduce revising cost of the encryption using application 13a.

Fifth Embodiment

Figure 8:
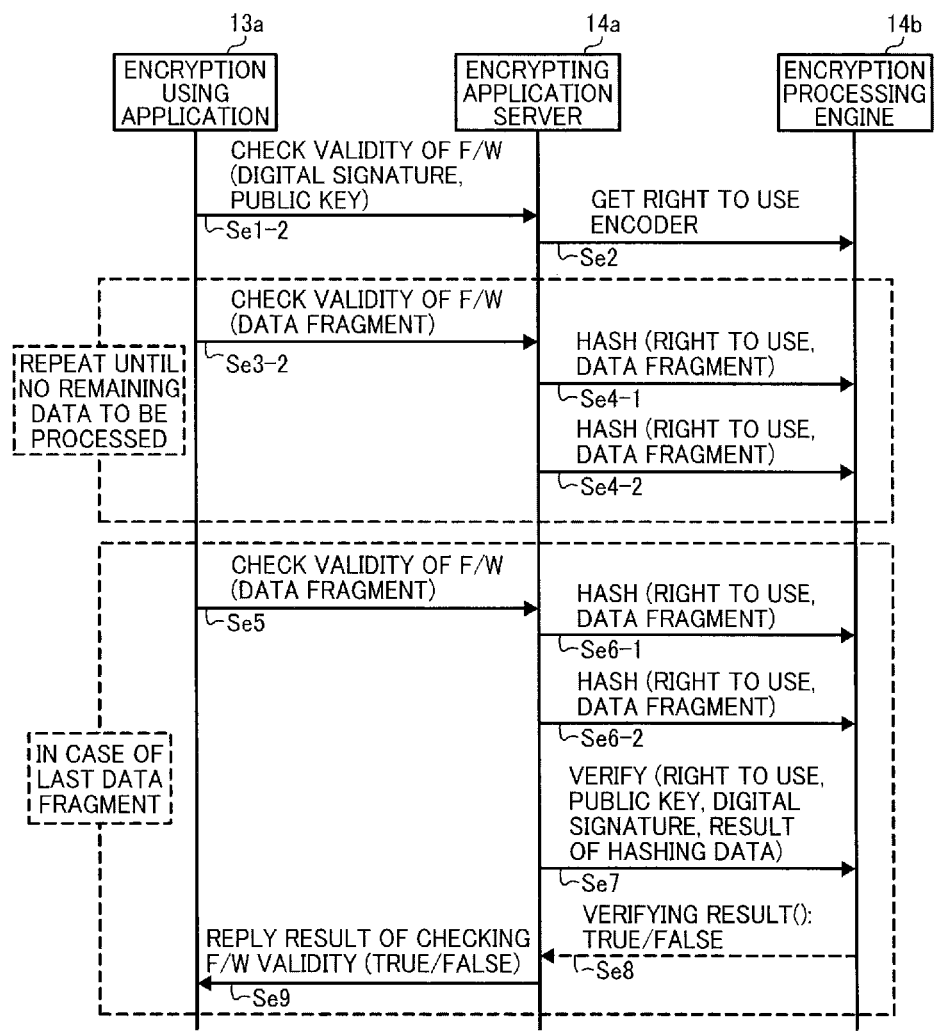
FIG. 8 is a sequence diagram illustrating a transfer of a composite system in a fifth embodiment of the present invention.

A composite system in a fifth embodiment of the present invention is described with reference to FIG. 8. FIG. 8 is a partly modified sequence diagram (FIG. 7) in the fourth embodiment, so the same symbols are assigned to the same parts and descriptions for those parts are omitted. In the fifth embodiment, the secure DB 14c preliminarily includes a public key. As shown in FIG. 4, the sub-system 12 includes the storage (secure) 12e, and the public key is stored in the storage (secure) 12e as the secure DB 14c.

In Se1-2, the encryption using application 13a executed by the CPU 11a sends a digital signature for checking validity of F/W to the encryption application server 14a executed by the CPU 12a in the sub-system 12 via the external connector 11d and the connector 12d.

By reading the public key from the secure DB 14c, the encryption application server 14a can use the public key in Se7. Fragment data used in Se3-2 does not need to be in multiples of 64 bytes; i.e., does not need alignment.

As described above, security of important data (F/W) can be assured by adding the secure DB 14c to the sub-system 12 without managing security data (public key) securely in the main system 11. Also, that can reduce the developing cost of the main system. Furthermore, the encryption using application 13a can transfer data in any size without considering the limitation of the encryption processing engine 14b in the sub-system 12 (e.g., hash process needs to be input in multiples of 64) by the encryption application server 14's having rule information regarding data alignment, and that can reduce effect of revising the encryption processing engine 14b in the sub-system 12, in other words, that can reduce the revising cost of the encryption using application 13a. In addition, the encryption using application 13a can be configured not to need to consider the encrypting specification.

Sixth Embodiment

Figure 9:
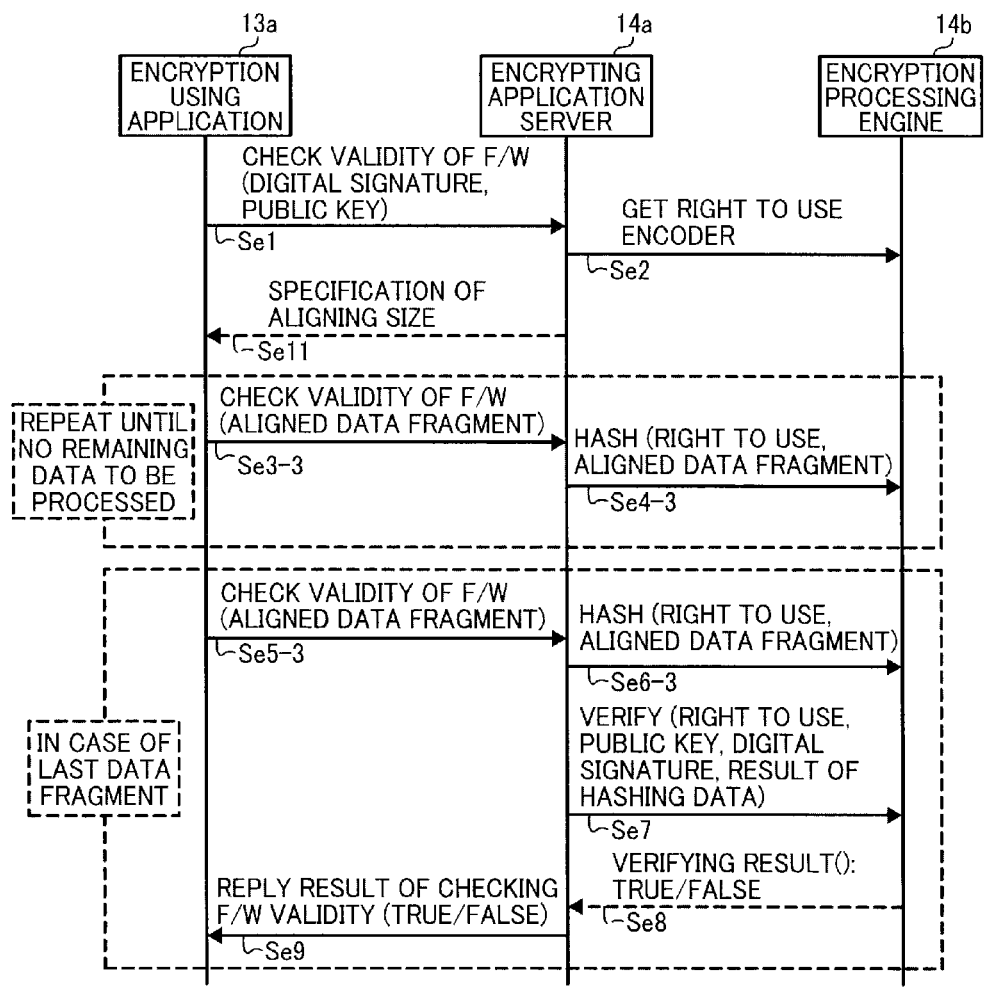
FIG. 9 is a sequence diagram illustrating a transfer of a composite system in a sixth embodiment of the present invention.

A composite system in a sixth embodiment of the present invention is described with reference to FIG. 9. FIG. 9 is a partly modified sequence diagram (FIG. 2) in the second embodiment, so the same symbols are assigned to the same parts and descriptions for those parts are omitted. In the sixth embodiment, the encryption application server 14a sends the specification for alignment size to the encryption using application 13a. Hereby, the specification for alignment size is defined as following:

specification={radix of alignment size, minimum value, maximum value}

For example, specification for alignment size is preferably set to {e.g.: 64B, 64B, 128 KB}.

Also, data fragments transferred in Se3-3, Se4-3, Se5-3, and Se6-3 are already aligned along with the specification described above. Therefore, since the number of hash process is reduced in Se4-3, the cost for alignment (copying memory between the memory 11b and the receiving buffer 12f, and between the receiving buffer 12f and the memory 12b) is also reduced.

As described above, the encryption using application 13a can avoid the cost for aligning data (increasing the number of hash processes) in the sub-system 12 and reduce effect (revising cost of the encryption using application) of change in specification of the sub-system 12 (e.g., hash is input in multiples of 16 rather than 64).

Seventh Embodiment

Figure 10A:
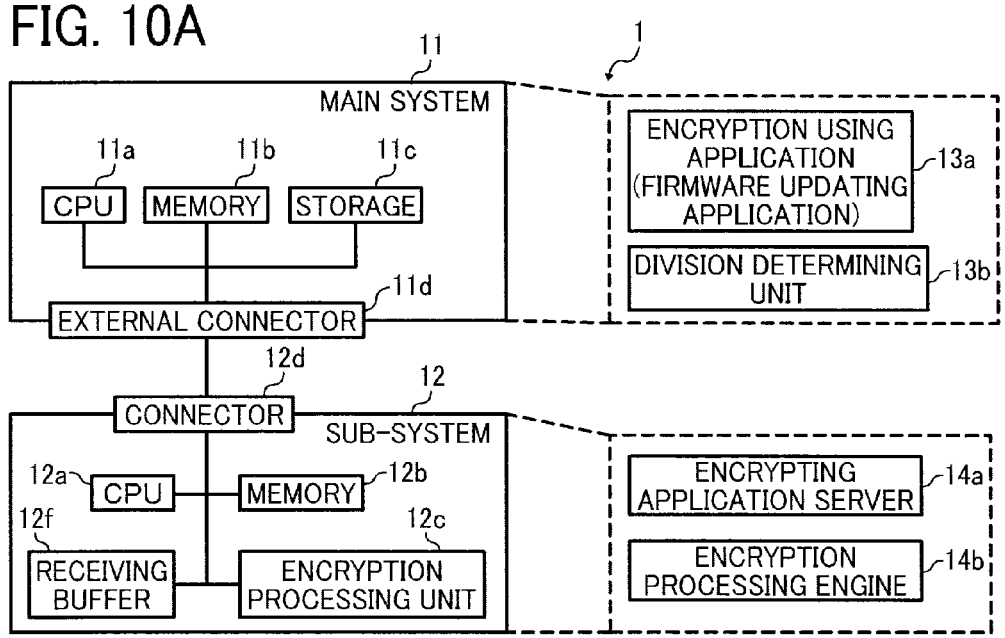
FIG. 10A and FIG. 10B are a diagram and a flowchart, respectively, illustrating a composite system in a seventh embodiment of the present invention.
Figure 10B:
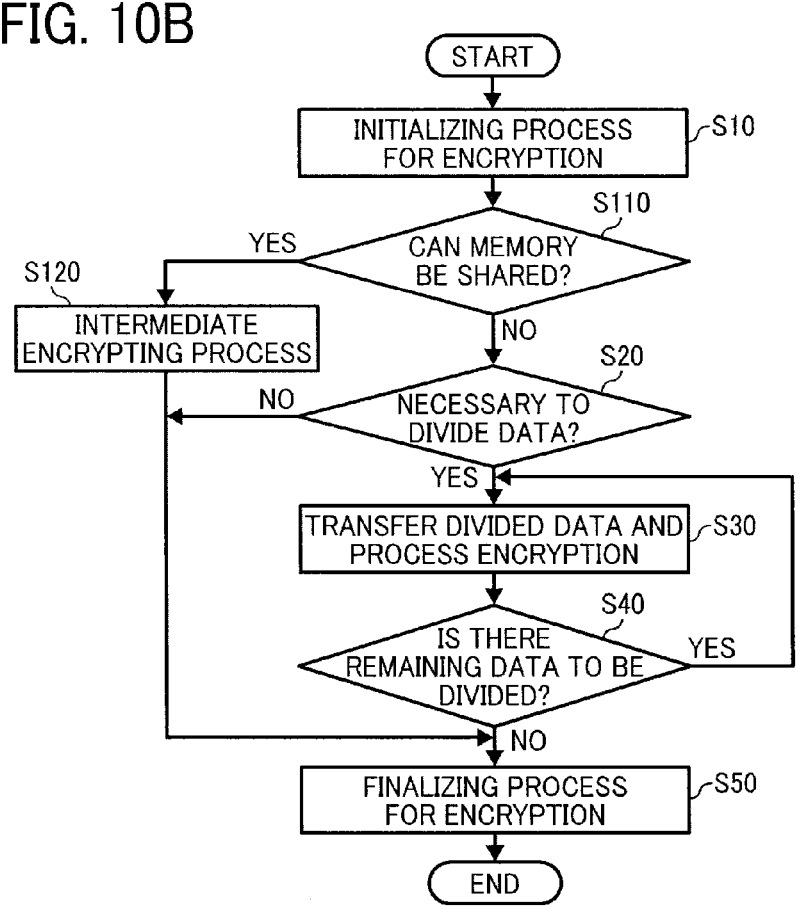

A composite system in a seventh embodiment of the present invention is described with reference to FIG. 10A and FIG. 10B. FIGS. 10A and 10B are a partly modified diagram (FIG. 1A) and flowchart (FIG. 2) in the first embodiment, so the same symbols are assigned to the same parts and descriptions for those parts are omitted. In the seventh embodiment, the main system 11 includes a division determining unit 13b implemented as software as shown in FIG. 10A. The division determining unit 13b determines whether or not it is necessary to transfer in division from the type of the bus. It should be noted that the main system 11 includes e.g., Peripheral Component Interconnect Express (PCIe) bus or USB bus as the external connector 11d.

In the flowchart shown in FIG. 10B, it is determined whether or not memory can be shared in S110. That is, it is determined whether or not memory can be shared based on the type of bus (e.g., PCIe bus? or USB bus?) If the type of bus is PCIe bus, the process proceeds to S120 since it is possible to share data. Otherwise, if the type of bus is USB bus, the process proceeds to S20 since it is impossible to share data.

Next, if the type of bus is PCIe bus, an intermediate encrypting process for big data en bloc is executed in S120 since it is possible to share data between the main system 11 and the sub-system 12. Otherwise, if the type of bus is USB bus, it is determined whether or not it is necessary to divide data in S20 since it is impossible to share data. That is, it is determined based on the size of data.

Figure 11:
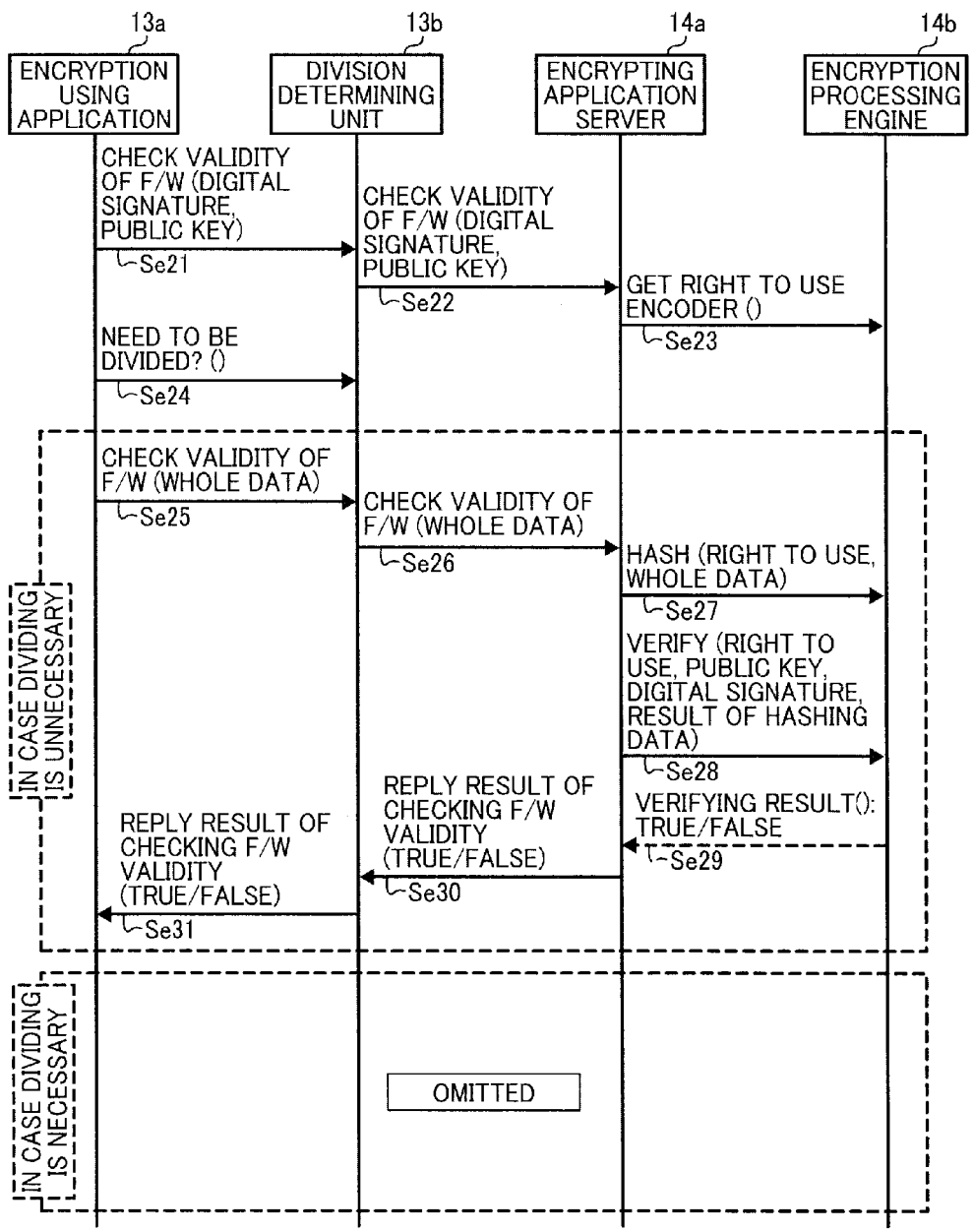
FIG. 11 is a sequence diagram illustrating a transfer of the composite system in the seventh embodiment of the present invention.

Next, the transferring sequence between the main system 11 and the sub-system 12 is described below with reference to FIG. 11. First, in Se21, the encryption using application 13a executed by the CPU 11a sends a digital signature and the public key for checking validity of F/W to the division determining unit 13b. Subsequently, in Se22, the division determining unit 13b sends the digital signature and the public key for checking validity of F/W to the encryption application server 14a executed by the CPU 12a in the sub-system 12 via the external connector 11d and the connector 12d.

Next, the encryption application server 14a executed by the CPU 12a stores the digital signature and the public key in the memory 12b. Subsequently, the encryption application server 14a sends a command to acquire the right to use the encryption processing unit 12c to the encryption processing engine 14b in Se23. Subsequently, in Se24, the encryption using application 13a sends a dividing necessary?( ) command that asks whether or not it is necessary to divide data to the division determining unit 13b. FIG. 13(b) illustrates the process executed in the division determining unit 13b.

The process in case it is necessary to divide data is described below. In Se25, the encryption using application 13a sends the whole data for checking validity of F/W to the division determining unit 13b. Subsequently, in Se26, the division determining unit 13b sends the whole data for checking validity of F/W to the encryption application server 14a. In Se27, the encryption application server 14a sends the right to use the encryption processing unit 12c and the data fragment to the encryption processing engine 14b to have the encryption processing unit 12c execute the hash processing. In Se28, the encryption application server 14a sends the right to use the encryption processing unit 12c, the public key, the digital signature, and the hashed result of data to the encryption processing engine 14b to have the encryption processing unit 12c execute the verifying process.

Next, in Se29, the encryption processing engine 14b outputs the true/false value as the result of the verifying process in the encryption processing unit 12c to the encryption application server 14a. Subsequently, in Se30, the encryption application server 14a outputs the true/false value as the result of the verifying process received from the encryption processing engine 14b to the division determining unit 13b. In Se31, the division determining unit 13b sends the true/false value as the result of the verifying process received from the encryption application server 14a to the encryption using application 13a.

As described above, depending on the type of bus that connects systems, for example PCIe bus is used, it is possible to speed up. That is, it is possible to speed up by sharing memory between the main system 11 and the sub-system 12 by using PCIe bus since dividing transfer is not necessary in the first place.

Eighth Embodiment

Figure 12:
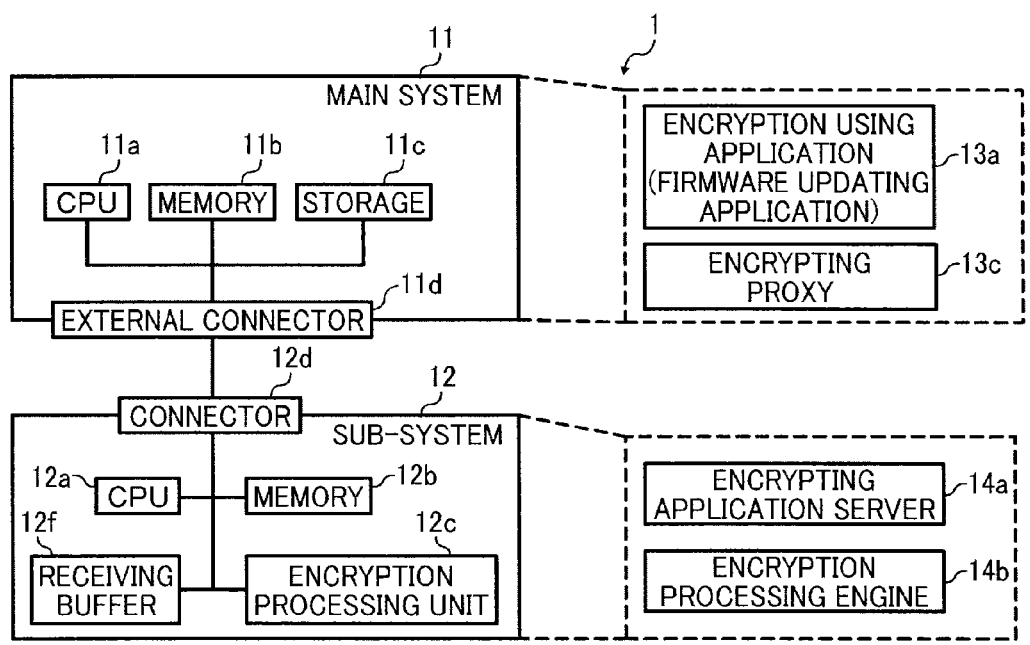
FIG. 12 is a diagram illustrating a composite system in an eighth embodiment of the present invention.

A composite system in an eighth embodiment of the present invention is described with reference to FIG. 12. FIG. 12 is a partly modified diagram (FIG. 10A) in the seventh embodiment, so the same symbols are assigned to the same parts and descriptions for those parts are omitted. As shown in FIG. 12, the main system 11 includes an encrypting proxy 13c (including the division determining unit 13b) implemented as software in the eighth embodiment. The encrypting proxy 13c in the main system 12 works so that it hides the dividing process from the encryption using application.

Figure 13:
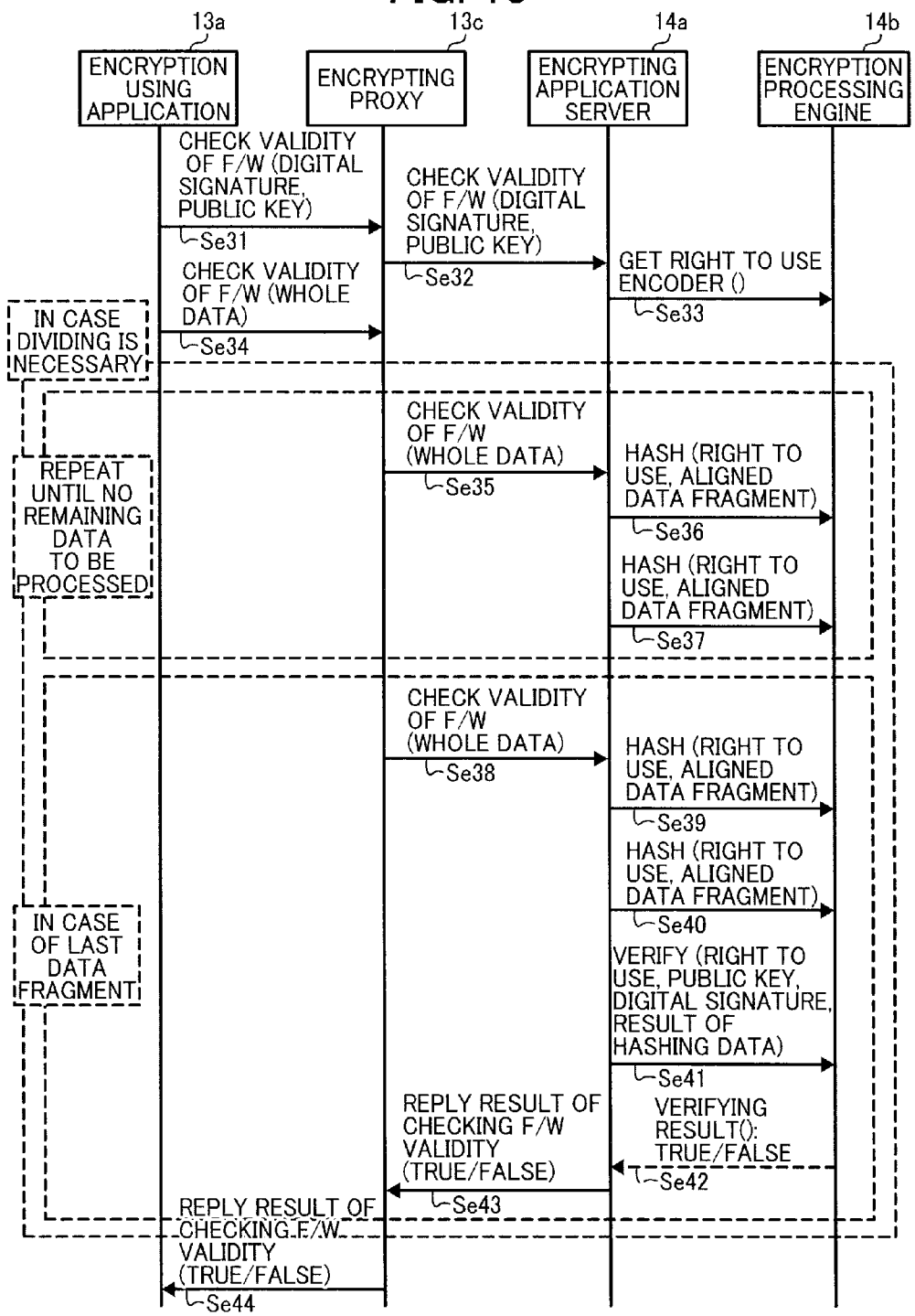
FIG. 13 is a sequence diagram illustrating a transfer of the composite system in the eighth embodiment of the present invention.

Next, the transferring sequence between the main system 11 and the sub-system 12 is described below with reference to FIG. 13. First, in Se31, the encryption using application 13a executed by the CPU 11a sends a digital signature and a public key for checking validity of F/W to the encrypting proxy 13c. Subsequently, in Se32, the encrypting proxy 13c sends the digital signature and the public key for checking validity of F/W to the encryption application server 14a executed by the CPU 12a in the sub-system 12 via the external connector 11d and the connector 12d.

Next, the encryption application server 14a executed by the CPU 12a stores the digital signature and the public key in the memory 12b. Subsequently, the encryption application server 14a sends a command to acquire right to use the encryption processing unit 12c to the encryption processing engine 14b in Se33. Subsequently, in Se34, the encryption using application 13a sends the whole data to the encrypting proxy 13c.

The process in case it is necessary to divide data is described below. In Se35, the encrypting proxy 13c sends data fragment for checking validity of F/W to the encryption application server 14a. Subsequently, in Se36, the encryption application server 14a sends the right to use the encryption processing unit 12c and the aligned data fragment to the encryption processing engine 14b to have the encryption processing unit 12c execute the hash processing. In Se37, the encryption application server 14a sends the right to use the encryption processing unit 12c and the aligned data fragment to the encryption processing engine 14b to have the encryption processing unit 12c execute the hash processing. It should be noted that process in Se37 is repeated until no more data remains.

For the last data fragment, in Se38, the encrypting proxy 13c sends the data fragment for checking validity of F/W to the encryption application server 14a. Subsequently, in Se39, the encryption application server 14a sends the right to use the encryption processing unit 12c and the aligned data fragment to the encryption processing engine 14b to have the encryption processing unit 12c execute hash processing. In Se40, the encryption application server 14a sends the right to use the encryption processing unit 12c and the aligned data fragment to the encryption processing engine 14b to have the encryption processing unit 12c execute the hash processing.

Next, in Se41, the encryption application server 14a sends the right to use the encryption processing unit 12c, the public key, the digital signature, and the hashed result of data to the encryption processing engine 14b to have the encryption processing unit 12c execute the verifying process. In Se42, the encryption processing engine 14b outputs the true/false value as the result of the verifying process in the encryption processing unit 12c to the encryption application server 14a. Subsequently, in Se43, the encryption application server 14a outputs the true/false value as the result of the verifying process received from the encryption processing engine 14b to the encrypting proxy 13c. In Se44, the encrypting proxy 13c sends the true/false value as the result of the verifying process received from the encryption application server 14a to the encryption using application 13a.

As described above, dividing process can be hidden from the encryption using application by including the encrypting proxy 13c in the main system 12. Also, effect of revision of the encryption processing engine 14b in the sub-system 12 (revising cost of the encryption using application) can be reduced since the encryption using application 13a does not need to consider dividing data due to bus specification.

Ninth Embodiment

Figure 14:
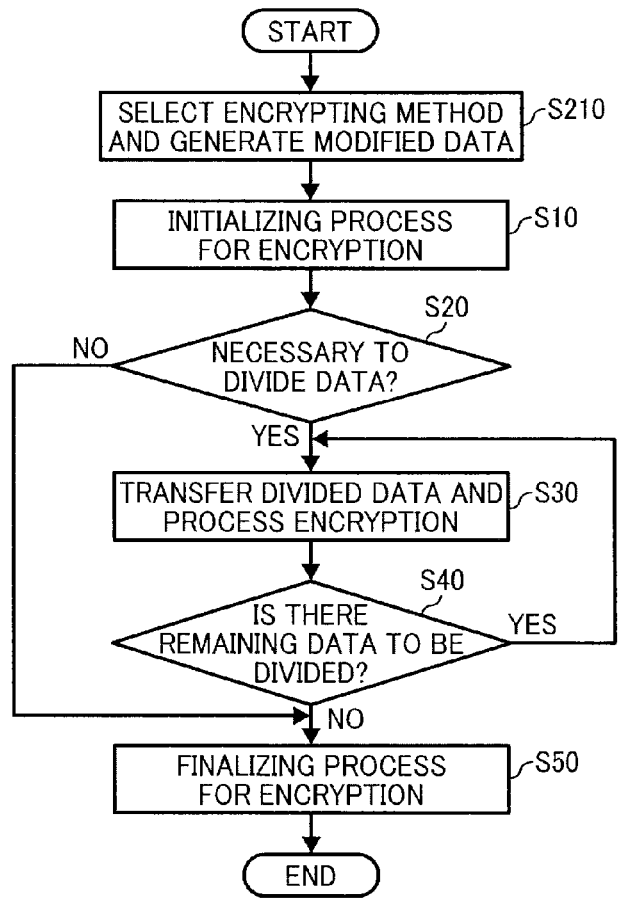
FIG. 14 is a flowchart illustrating a composite system in a ninth embodiment of the present invention.
Figure 15:
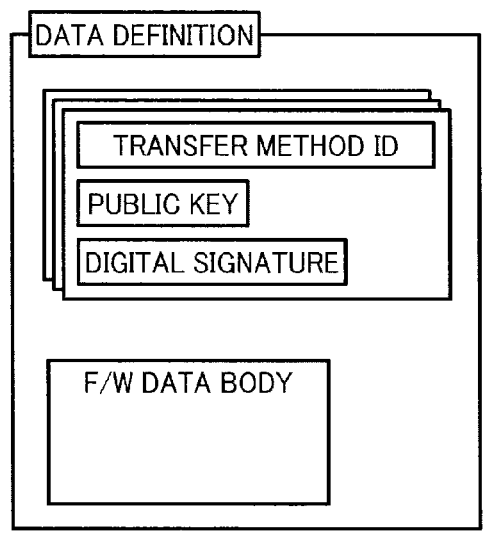
FIG. 15 is a diagram illustrating a data structure to be checked validity of firmware for the composite system in the ninth embodiment of the present invention.
Figure 16:
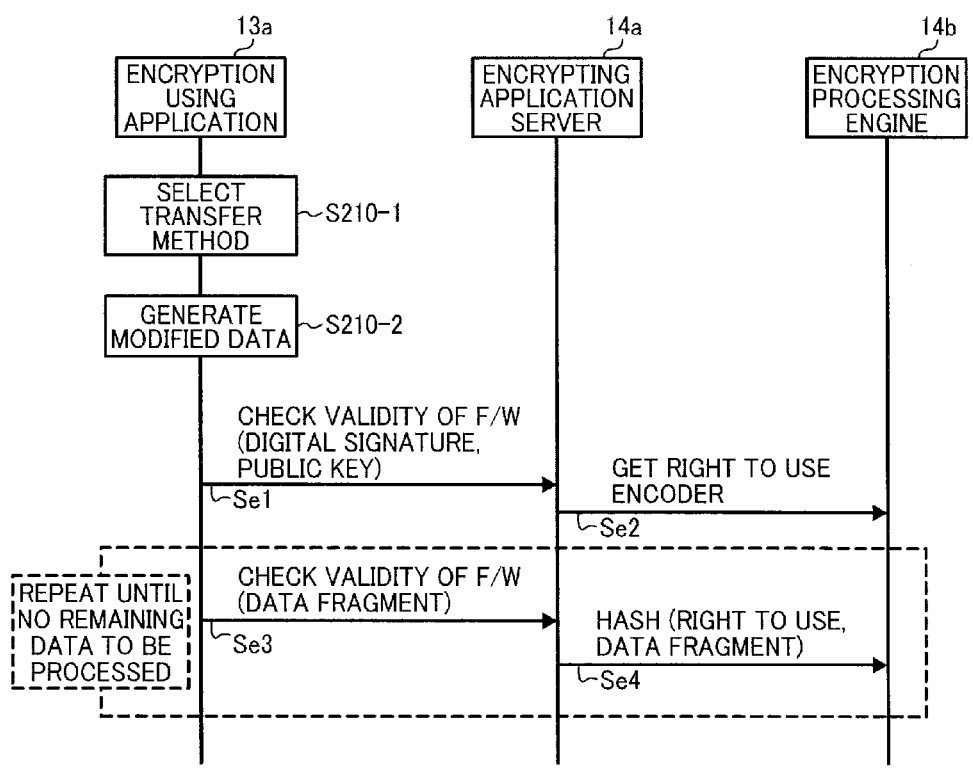
FIG. 16 is a sequence diagram illustrating a transfer of the composite system in the ninth embodiment of the present invention.

A composite system in a ninth embodiment of the present invention is described below with reference to FIG. 14. FIG. 14 is a partly modified diagram (FIG. 1) in the first embodiment and the flowchart (FIG. 10B) in the seventh embodiment, so the same symbols are assigned to the same parts and descriptions for those parts are omitted. In the flowchart shown in FIG. 14, the encryption using application 13a chooses a transfer method and executes a modified data generating process in S210. As shown in data definition in FIG. 15, pairs of a digital signature and a public key that correspond to each transfer method ID are provided in the ninth embodiment. In verifying validity, modified F/W data is dynamically generated aside from the original in response to a transfer method ID. As shown in the sequence diagram in FIG. 16, the encryption using application 13a chooses a transfer method in response to a transfer method ID in S210-1 in the ninth embodiment. Also, the encryption using application 13a generates the modified F/W data in response to the transfer method ID in S210-2. It should be noted that modified data (firmware generated by bit inversion) can be newly generated in response to the transfer method ID. For example, if a transfer method ID is XOR, the encryption using application 13a sends a digital signature that corresponds to the transfer method (XOR) to the encryption application server 14a.

As described above, security performance can be improved by storing a plurality of digital signatures that correspond to converting results of target data in the main system 11 since it is difficult to restore the data even if the data is wiretapped on a data transferring route.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A composite system, comprising:
   a main system including circuitry configured to operate with a main program; and
   a sub-system including circuitry configured to operate both with sub-programs and under the control of the main system and including a receiving buffer, the sub-system being attachably and detachably connected to the main system via a predefined bus through an external connection of the main system, wherein
   the circuitry of the main system is configured to
      determine whether or not to divide target data to be encrypted based upon a type of the predefined bus,
      calculate a size of a fragment of divided data based upon a size of the receiving buffer and a size of the target data,
      divide the target data into fragments of divided target data based upon the size of the fragment,
      fix the size of the fragment, and
      transfer each fragment of divided target data to be encrypted to the sub-system,
   the receiving buffer is configured to read and write the fragments of data received from the main system temporarily, and
   the circuitry of the main system and the sub-system are configured to execute an encrypting process even if the size of the target data to be encrypted is bigger than the size of the receiving buffer in the sub-system.

2. The composite system according to claim 1, wherein the sub-system comprises a secure database to store a public key.

3. The composite system according to claim 2, wherein the sub-system comprises an encrypting application server configured to access the secure database.

4. The composite system according to claim 3, wherein the encrypting application server stores information that indicates a data aligning rule.

5. The composite system according to claim 4, wherein the circuitry of the sub-system is configured to execute the encrypting application server that stores the information that indicates the data aligning rule and is configured to access the secure database.

6. The composite system according to claim 5, wherein the circuitry of the main system is configured to execute the encryption using an application that acquires the data aligning rule from the encrypting application server.

7. The composite system according to claim 1, further comprising an encrypting process proxy configured to hide a dividing process from the encryption process using an application.

8. The composite system according to claim 1, wherein the main system stores a plurality of digital signatures that correspond to target data conversion results.

9. The composite system according to claim 1, wherein the circuitry of the main system is configured to determine not to divide the target data to be encrypted when the type of the predefined bus is a Peripheral Component Interconnect Express (PCIe).

10. The composite system according to claim 1, wherein the circuitry of the main system is configured to determine to divide the target data to be encrypted when the type of the predefined bus is a Universal Serial Bus (USB).

11. The composite system according to claim 9, wherein the circuitry of the main system is configured to determine to divide the target data to be encrypted when the type of the predefined bus is a Universal Serial Bus (USB).

12. The composite system according to claim 1, wherein the circuitry of the main system is configured to determine not to divide the target data to be encrypted when the type of the predefined bus is one which allows sharing of data between the main system and the sub-system.

13. The composite system according to claim 1, wherein the circuitry of the main system is configured to determine to divide the target data to be encrypted when the type of the predefined bus is one where sharing of data between the main system and the sub-system is impossible.

14. The composite system according to claim 12, wherein the circuitry of the main system is configured to determine to divide the target data to be encrypted when the type of the predefined bus is one where sharing of the data between the main system and the sub-system is impossible.

15. The composite system according to claim 1, wherein the circuitry of the main system is configured to determine not to divide the target data to be encrypted when the type of the predefined bus is one which allows sharing of memory between the main system and the sub-system.

16. The composite system according to claim 1, wherein the circuitry of the main system is configured to determine to divide the target data to be encrypted when the type of the predefined bus is one where sharing of memory between the main system and the sub-system is impossible.

17. The composite system according to claim 15, wherein the circuitry of the main system is configured to determine to divide the target data to be encrypted when the type of the predefined bus is one where sharing of the memory between the main system and the sub-system is impossible.

18. The composite system according to claim 1, wherein the sub-system includes a plurality of sub-systems.

19. A method of transferring data, comprising the steps of:
- determining, via circuitry of a main system, whether or not to divide target data to be encrypted based upon a type of a predefined bus;
- calculating, via the circuitry of the main system, a size of a fragment of divided data based upon a size of a receiving buffer of a sub-system and a size of the target data, the sub-system being attachably and detachably connected to the main system via the predefined bus through an external connection of the main system;
- dividing, via the circuitry of the main system, the target data into fragments of divided target data based upon the size of the fragment;
- fixing, via the circuitry of the main system, the size of the fragment;
- transferring, via the circuitry of the main system, each fragment of divided target data to be encrypted to the sub-system;
- reading and writing, via circuitry of the sub-system, the fragments received from the main system via the predefined bus temporarily to the receiving buffer; and
- having the circuitry of the main system and the circuitry of the sub-system execute an encrypting process even if the size of the target data to be encrypted is bigger than the size of the receiving buffer in the sub-system.

20. A non-transitory computer-readable storage medium storing a program that, when executed by a computer, causes the computer to implement a method of transferring data, the method comprising the steps of:
- determining whether or not to divide target data to be encrypted based upon a type of a predefined bus;
- calculating a size of a fragment of divided target data upon a size of a receiving buffer and a size of the target data;
- dividing the target data into fragments of divided target data based upon the size of the fragment;
- fixing the size of the fragment;
- transferring each fragment of divided target data to be encrypted to a sub-system;
- reading and writing the fragments received from a main system via the predefined bus temporarily to the receiving buffer, the sub-system being attachably and detachably connected to the main system via the predefined bus through an external connection of the main system; and
- having the main system and the sub-system execute an encrypting process even if the size of the target data to be encrypted is bigger than the size of the receiving buffer in the sub-system.

* * * * *